Nov. 10, 1931.  E. E. WICKERSHAM  1,831,216
THRASHING
Filed May 28, 1929
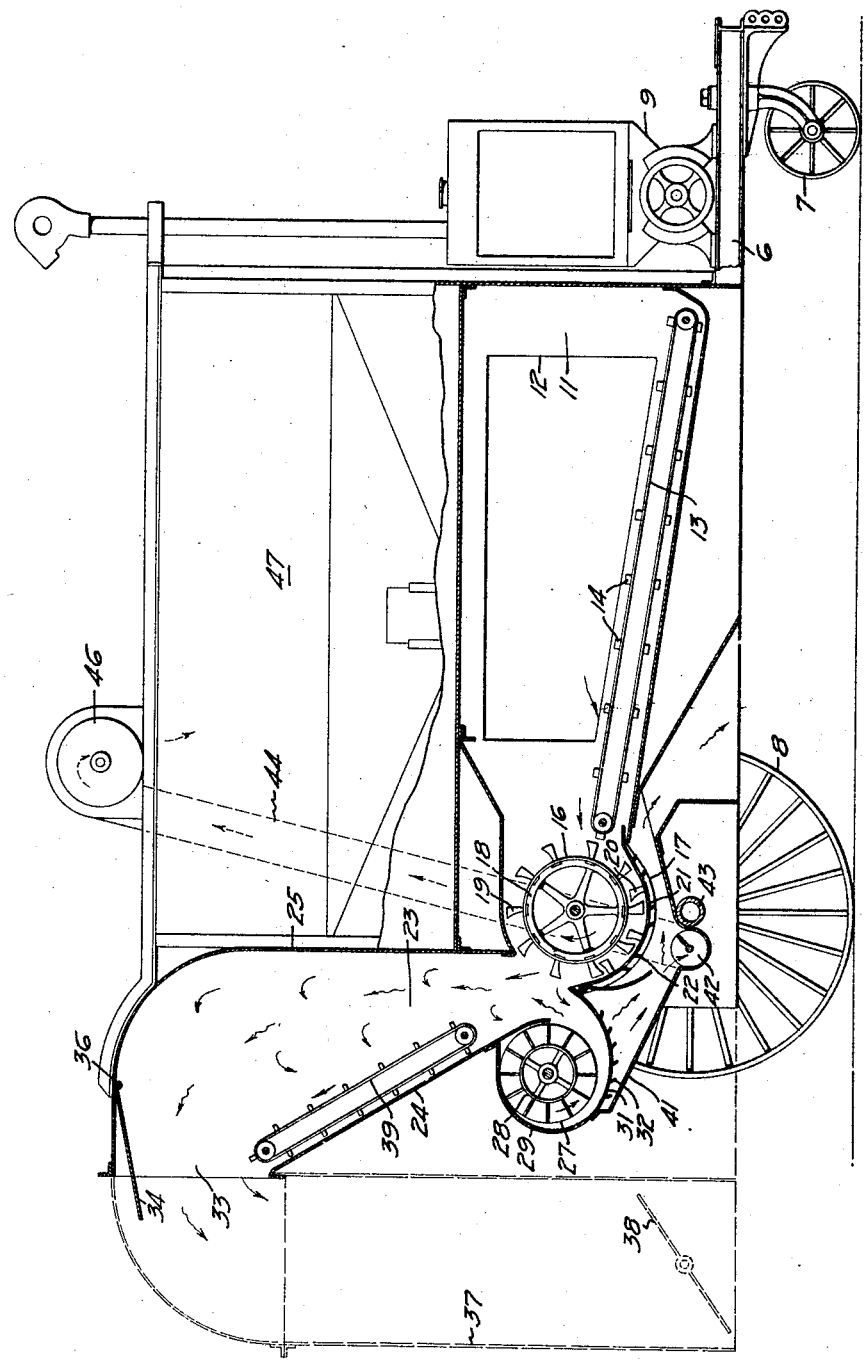
INVENTOR
*Elmer E. Wickersham*
BY
*White, Prost Fryer*
ATTORNEYS Patented Nov. 10, 1931

1,831,216

UNITED STATES PATENT OFFICE

ELMER E. WICKERSHAM, OF SAN LEANDRO, CALIFORNIA, ASSIGNOR TO CATERPILLAR TRACTOR CO., OF SAN LEANDRO, CALIFORNIA, A CORPORATION OF CALIFORNIA

THRASHING

Application filed May 28, 1929. Serial No. 366,586.

My invention relates to methods of and devices for thrashing grain and is especially applicable to the manner of operation of and construction of the separator unit of a combined harvester.

In harvesting grain it is the custom to cut the standing grain and pass it through a mechanism for thrashing the grain kernels from the grain straw. This thrashing operation is ordinarily conducted by means of a relatively rapidly revolving cylinder and co-operating concaves. A large part of the separation between the grain kernels and the grain straw takes place during the passage of the grain through the cylinder and the concaves wherein the grain kernels drop gravitally into a suitable receiver. A certain proportion of the grain kernels however remain intermixed with the grain straw and a large part of the mechanism of the customary separator unit is employed for the purpose of effecting separation of these residual grain kernels from the grain straw. Usually the straw is so intertangled and matted that considerable agitation and treatment thereof is required before the grain kernels can pass gravitally therethrough and become separated therefrom.

It is an object of my invention to ensure practically complete separation of grain kernels from grain straw.

Another object of my invention is to simplify very materially the mechanism necessary for effecting separation of grain kernels from grain straw.

An additional object of my invention is to employ air currents for sufficiently dispersing the straw to permit the gravital separation of the grain kernels therefrom.

An additional object of my invention is to effect such separation with substantially no mechanical contact with the straw to prevent the straw becoming shattered and intermixing with the grain kernels.

The foregoing and other objects are attained in the embodiment of the invention shown in the drawing, in which the figure is a cross section on a vertical longitudinal plane of a grain harvester constructed in accordance with my invention.

In its preferred form, my grain harvester comprises a chamber having a substantially vertical axis into which thrashed grain is projected by a cylinder and co-operating concave and into which also is introduced a current of air impacting with the discharged thrashed grain to disperse the straw and permit the gravital separation of the grain kernels therefrom, in combination with means for discharging the separated straw from the harvester and with means for receiving and collecting the separated grain kernels.

As shown in the drawing, my invention is preferably embodied in the separating unit of a combined harvester although it may be otherwise employed. I preferably provide a frame 6 supported at its forward end on a caster wheel 7 and at its rearward portion on ground engaging wheels 8. Adjacent the leading portion of the vehicle is a source of power such as an internal combustion engine 9 which is suitably connected to the harvesting mechanism to impart the necessary motion thereto. To the rear of the engine is a feeder house 11 of the customary kind which encompasses an opening 12 to receive the spout of a draper, not shown. Within the feeder house is a Jackson feeder 13 comprising an endless belt having cleats 14 affixed thereto at spaced intervals.

Cut grain which is introduced into the feeder house 11 through the aperture 12 is discharged onto the Jackson feeder 13 and is carried by the upper run thereof toward the rear of the machine where it is introduced between a cylinder 16 and co-operating concaves 17.

The cylinder comprises a revolving drum 18 carrying a plurality of radially projecting teeth 19 interengaging similar teeth 20 on the concaves. The direction of rotation of the cylinder is such that the cut grain is taken from the Jackson feeder 13 and is passed between the interengaging teeth of the cylinder and concaves. The concaves are constructed preferably of perforated sheet metal providing apertures 21 and associated depending lips 22 permitting the passage therethrough of grain kernels which are thrashed from the straw during the passage of the grain through the cylinder and concave unit.

The concaves extend sufficiently far around the periphery of the cylinder to effect a discharge of the thrashed grain therefrom in a direction slightly inclined to the vertical and into a chamber 23 mounted on the harvester frame 6 and having its longitudinal axis substantially vertical. This chamber has diverging walls 24 and 25 and extends substantially the full height of the machine. Thrashed grain which is discharged by the cylinder 16 is passed into the chamber 23 to permit the gravital separation of the remaining grain kernels from the straw.

To assist in the separation and to effect such separation without employing mechanical contact with the straw and with the omission of a great deal of the customary mechanism I preferably mount a blower 27 on the frame 6 and on the opposite side of the axis of chamber 23 from the cylinder. The blower includes a rotating impeller 28 mounted in and closed by a housing 29. The housing on a portion of its lower periphery is provided with perforations 31 and is formed with depending lips 32. It will be noted that the housing 29 defines a secondary chamber in which the blower or fan is mounted.

The current of air discharged by the blower is in such a direction as to impact with the stream of thrashed grain discharged by the cylinder and concaves to effect a resultant path of movement of the stream in a substantially vertical direction or substantially in the same direction as the major axis of chamber 23. In the illustrated embodiment of the invention the blower is arranged to discharge a current of air in a direction slightly inclined to the vertical and partially opposed to the stream of mixed grain and straw discharged by the cylinder, the two streams being thereby caused to merge and produce a resultant substantially vertical stream of mixed air, grain, and straw in the chamber 23. The current of air is additionally effective in dispersing and blowing the straw into a loose fluffy mass without breaking it, thus permitting the ready and facile separation of the relatively dense grain kernels from the grain straw.

During the upward movement of the stream in the chamber 23 substantially all or practically all of the grain kernels separate gravitally from the grain straw and the remaining straw then passes through an upper outlet 33 of variable area governed by a deflector 34 hinged to the walls of chamber 23 as at 36. Straw discharged from the chamber 23 is either broadcast over the field or is discharged into a straw receiver 37 attached to the chamber and depending therefrom. The lower end of the straw receiver carries a rotatable damper 38 which may be periodically opened to discharge the straw in piles.

To assist in the discharge from chamber 23 of straw which might otherwise tend to fall gravitally back into the blower 27 I provide a suitable belt conveyor 39 arranged on the rearward wall of chamber 23 and having its upper run traveling toward the discharge 33 so that straw which is caught thereby is discharged into the outlet.

Grain kernels which are separated in chamber 23 fall gravitally into the lower portion of the blower housing 29 and are sufficiently dense to overcome the velocity of the air current issuing therefrom and to pass through apertures 31. Such grain kernels are received in a pan 41 extending beneath the blower and leading to a cross auger 42 situate adjacent the vehicle axle 43. The forward end of pan 41 extends below the concave 17 and receives grain kernels which pass therethrough. The forward end of the pan is directed downwardly as a vent to the atmosphere. The inclination of pan 41 is such as to collect all grain kernels gravitally into auger 42 from which they are taken by an elevator 44 to a re-cleaner 46 of any suitable kind and are then discharged into a bulk grain bin 47 overlying the feeder house 11 and supported upon the harvester frame 6.

By virtue of my invention, a grain harvester is provided in which the separation of grain kernels from the grain straw is effected gravitally and is greatly enhanced by the use of a current of air for dispersing and agitating the grain straw. A portion of the air is useful in blowing chaff from the collected kernels and assisting in the thrashing operation. It is not necessary to provide mechanical beaters or similar structures for agitating the grain straw and the mechanism utilized is simpler than that customarily employed.

It is to be understood that I do not limit myself to the form of the grain harvester shown and described herein, as the invention, as set forth in the following claims may be embodied in a plurality of forms.

I claim:

1. A grain harvester comprising a chamber having an approximately vertical longitudinal axis, a cylinder, perforate concaves cooperating with said cylinder to thrash grain, an air blower for blowing said thrashed grain along said axis into said chamber, and means for directing air from said blower underneath said concaves.

2. A grain harvester comprising a chamber having an approximately vertical longitudinal axis, perforate concaves on one side of said axis, a cylinder coperating with said concaves to thrash grain and to discharge said grain into said chamber, an air blower on the other side of said axis adapted to blow said discharged grain in a stream in the direction of said axis, and means for directing air from said blower underneath said concaves.

3. A grain harvester comprising a chamber, perforate concaves adjacent the lower end of said chamber, a cylinder cooperating with said concaves to discharge thrashed grain into said chamber, a perforate housing adjacent the lower end of said chamber, means for discharging a current of air from said housing and into said chamber, means for receiving grain kernels gravitally separated from the grain in said chamber and passing the perforations in said housing, and means for directing air from said air discharging means through said receiving means.

4. The method of separating kernels from cut grain which consists in thrashing said grain, in providing a vertically moving column of air of such characteristics that when thrashed grain is placed in said column only the kernels will descend therein and such that said descending kernels will encounter air moving at velocities which are increasingly greater, in placing said thrashed grain in said vertically moving columns of air, in providing a downwardly moving column of air, and in finally placing the descended kernels in said downwardly moving column of air.

5. The combination with a thrasher having a cylinder and means for discharging kernels radially from said cylinder and means for discharging kernels and straw tangentially, of means for applying a blast of air substantially normal to the direction of discharge of said kernels and for applying another blast of air substantially in line with the direction of discharge of said kernels and straw.

6. A grain thrasher, comprising a cylinder arranged to discharge thrashed grain and straw in a direction slightly inclined to the vertical, an air blower arranged to discharge a partially opposed current of air in a direction slightly inclined to the vertical and merging with the grain discharged by said cylinder to produce a resultant substantially vertically moving stream of mixed grain, air, and straw, and a vertically extending chamber mounted to receive and pass said resultant stream upwardly.

7. In a thrasher, a cylinder, a perforate concave, a substantially vertical expansion chamber disposed adjacent and above said cylinder and concave into which the cylinder vertically discharges thrashed material, said chamber having a restricted lower opening, a trough extending under said concave and opening, a fan disposed below and at the opposite side of the chamber from the cylinder and arranged to direct a blast upward in said chamber and between the concave and the trough.

8. In a thrashing machine, the combination of a thrashing cylinder, a perforate concave spaced below the cylinder, a vertical chamber into which the cylinder discharges, a secondary chamber below the said vertical chamber having a perforate bottom wall, a trough below said perforate concave and said perforate wall and a fan in said secondary chamber discharging through said vertical chamber and through the space between the concave and trough.

9. In combination with a thrasher having a cylinder and concave, a separator having a chamber into which said cylinder discharges kernels and straw, said concave having a perforate extension portion arranged to receive kernels from the chamber and to discharge only kernels, an air blower, means for discharging a portion of the stream from said air blower upwardly through said chamber and for discharging another portion of said stream to receive kernels falling from said upwardly discharged air stream and through said perforations to assist said falling kernels through said perforations.

10. In a thrasher, a perforated partition, a separating chamber on one side of said perforated partition, a thrashing chamber arranged to discharge thrashed grain into said separating chamber, a cleaning chamber on the side of said partition opposite said separating chamber, and an air blower for discharging a first air stream to separate kernels from a mass of kernels and material in said separating chamber, and for discharging a second air stream to clean kernels passing through said perforated partition into said cleaning chamber.

11. In a thrasher, a perforated partition, a separating chamber on one side of said perforated partition, a thrashing chamber on the said side of said partition and being arranged to discharge thrashed grain into said separating chamber, a cleaning chamber on the other side of said partition, and an air blower for discharging a first air stream to separate the kernels from the mass of kernels and material in said separating chamber, and for discharging a second air stream to clean the kernels passing through the perforated partition into said cleaning chamber.

In testimony whereof, I have hereunto set my hand.

ELMER E. WICKERSHAM.